United States Patent
Kim et al.

(10) Patent No.: US 9,806,783 B2
(45) Date of Patent: Oct. 31, 2017

(54) BEAMFORMING TRAINING

(71) Applicant: LG ELECTRONICS INC., Seoul (KR)

(72) Inventors: Sanggook Kim, Seoul (KR); Kyungtae Jo, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/406,598

(22) Filed: Jan. 13, 2017

(65) Prior Publication Data

US 2017/0207837 A1  Jul. 20, 2017

Related U.S. Application Data

(60) Provisional application No. 62/278,444, filed on Jan. 14, 2016, provisional application No. 62/305,535, filed on Mar. 9, 2016.

(51) Int. Cl.
| | |
|---|---|
| *H04B 1/00* | (2006.01) |
| *H04B 15/00* | (2006.01) |
| *H04B 7/06* | (2006.01) |
| *H01Q 3/12* | (2006.01) |
| *H01Q 3/10* | (2006.01) |
| *H01Q 3/30* | (2006.01) |
| *H01Q 3/24* | (2006.01) |
| *H04W 28/16* | (2009.01) |
| *H04W 84/04* | (2009.01) |
| *H01Q 3/00* | (2006.01) |
| *H04M 1/00* | (2006.01) |

(52) U.S. Cl.
CPC ........... *H04B 7/0604* (2013.01); *H01Q 3/005* (2013.01); *H01Q 3/10* (2013.01); *H01Q 3/12* (2013.01); *H01Q 3/24* (2013.01); *H01Q 3/30* (2013.01); *H04B 7/0617* (2013.01); *H04W 28/16* (2013.01); *H04W 84/042* (2013.01)

(58) Field of Classification Search
CPC ....... H04B 7/0604; H04B 7/0617; H01Q 3/24
USPC .............................................. 455/63.4, 562.1
See application file for complete search history.

(56) References Cited

U.S. PATENT DOCUMENTS

| | | | | |
|---|---|---|---|---|
| 2011/0064033 A1* | 3/2011 | Gong | ................... | H04B 7/0617 370/329 |
| 2015/0351026 A1* | 12/2015 | Lee | ..................... | H04W 40/244 370/237 |
| 2017/0026099 A1* | 1/2017 | Levy | .................... | H04B 7/0617 |

* cited by examiner

*Primary Examiner* — Ayodeji Ayotunde
(74) *Attorney, Agent, or Firm* — Lee, Hong, Degerman, Kang & Waimey PC

(57) ABSTRACT

Provided are a method and apparatus for performing beamforming training in a wireless local area network. The apparatus receives a plurality of beacon frames for sector sweep in a beacon transmission interval (BTI) from an access point (AP). At least one beacon frame of the plurality of beacon frames includes overload information which indicates an overload state. The apparatus performs a random backoff on a plurality of channels during association-beamforming training (A-BFT) consequent to the BTI based on the overload information.

13 Claims, 8 Drawing Sheets

FIG. 7

| Overload Indicator (710) | RSS Backoff 1 (720-1) | RSS Retry Limit 1 (730-1) | ... | RSS Backoff N (720-N) | RSS Retry Limit N (730-N) |

BEAMFORMING TRAINING

CROSS-REFERENCE TO RELATED APPLICATIONS

Pursuant to 35 U.S.C. §119(e), this application claims the benefit of U.S. Provisional Patent Application Nos. 62/278,444, filed on Jan. 14, 2016 and 62/305,535, filed on Mar. 9, 2016, the contents of which are all hereby incorporated by reference herein in their entirety.

BACKGROUND OF THE INVENTION

Field of the Invention

The present invention relates to a wireless communication system, and more particularly, to a method of performing beamforming training and an apparatus (or system) using the same.

Related Art

An IEEE 802.11ad standard is a very high-speed wireless communication standard that operates in a band of 60 GHz or above. Even though a signal can reach about 10 meters, the throughput may support 6 Gbps or more. Since the IEEE 802.11ad standard operates in a high frequency band, signal propagation is dominated by ray-like propagation. As a transmit (TX) or receive (RX) antenna beam is arranged toward a strong spatial signal path, signal quality thereof may be improved.

The IEEE 802.11ad standard includes a beamforming training process for antenna beam alignment. To achieve throughput of 20 Gbps or more, a next-generation standard that is being developed on the basis of the IEEE 802.11ad is called as an IEEE 802.11ay.

Either of the requirements discussed in IEEE 802.11ay supports not only the indoor environment but also the outdoor environment. Compared with the indoor environment, there are so many devices in the outdoor environment. Frequent collisions may occur due to many devices trying to access a channel at the same time, and beamforming training or connection processing may be delayed.

In situations where frequent collisions are expected, beamforming training that can support connection of more devices is required.

SUMMARY OF THE INVENTION

The present invention provides a method of performing beamforming training using a plurality of array antennas.

In an aspect, a method for performing beamforming training in a wireless local area network includes receiving, by a station (STA), a plurality of beacon frames for sector sweep in a beacon transmission interval (BTI) from an access point (AP), at least one beacon frame of the plurality of beacon frames including overload information which indicates an overload state, and performing, by the STA, a random backoff on a plurality of channels during association-beamforming training (A-BFT) consequent to the BTI based on the overload information.

The overload information may comprise an overload indicator indicating the overload state, a responder sector sweep (RSS) backoff and an RSS retry limit.

The RSS backoff and the RSS retry limit may be commonly applied to the plurality of channels.

The overload information may comprise a plurality of RSS backoffs for the plurality of channels and a plurality of RSS retry limits for the plurality of channels.

In another aspect, an apparatus for performing beamforming training in a wireless local area network includes a transceiver configured to transmit and receive a radio signal and a processor connected to the transceiver. The process is configured to receive a plurality of beacon frames for sector sweep in a beacon transmission interval (BTI) from an access point (AP), at least one beacon frame of the plurality of beacon frames including overload information which indicates an overload state, and perform a random backoff on a plurality of channels during association-beamforming training (A-BFT) consequent to the BTI based on the overload information.

In an environment where many devices exist, it is possible to increase the capacity of a system by adjusting the number of devices trying beamforming training according to the degree of congestion.

BRIEF DESCRIPTION OF THE DRAWINGS

FIG. 7 shows another example of the overload information.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user.

A Basic service set (BSS) is a building block of the wireless local area network (WLAN) based on the IEEE 802.11 standard. The BSS may include a plurality of STAs which perform direct communication with each other. The WLAN may provide two types of sets, for example, independent BSS (IBSS) and personal BSS (PBSS). The IBSS may be a basic type. The PBSS may be a type of wireless local area network (WLAN), in which the respective STAs communicate directly with each other, as an ad-hoc network. A STA in the PBSS may perform a role of the PBSS control point (PCP). The PCB may provide a beacon transmission, a service period (SP) allocation, etc.

An access point (AP) may be an entity which provides a connection (or association) between multiple BSSs. One STA in the PBSS may perform a role of the AP and another STA that belongs to different BSSs may communicate through the AP. The AP may manage the beacon transmission and association (or association response). Hereinafter, the AP and the PCP, which are not divided separately, may be referred to as a "AP".

The STA may include non-AP STA or AP unless a STA function and an AP function are divided separately. When a communication between the STA and the AP is described, the STA may be interpreted as the non-AP STA. When a communication between a STA and a STA is described or when the AP function is not required separately, the STA may be the non-AP STA or the AP.

Figure 1:
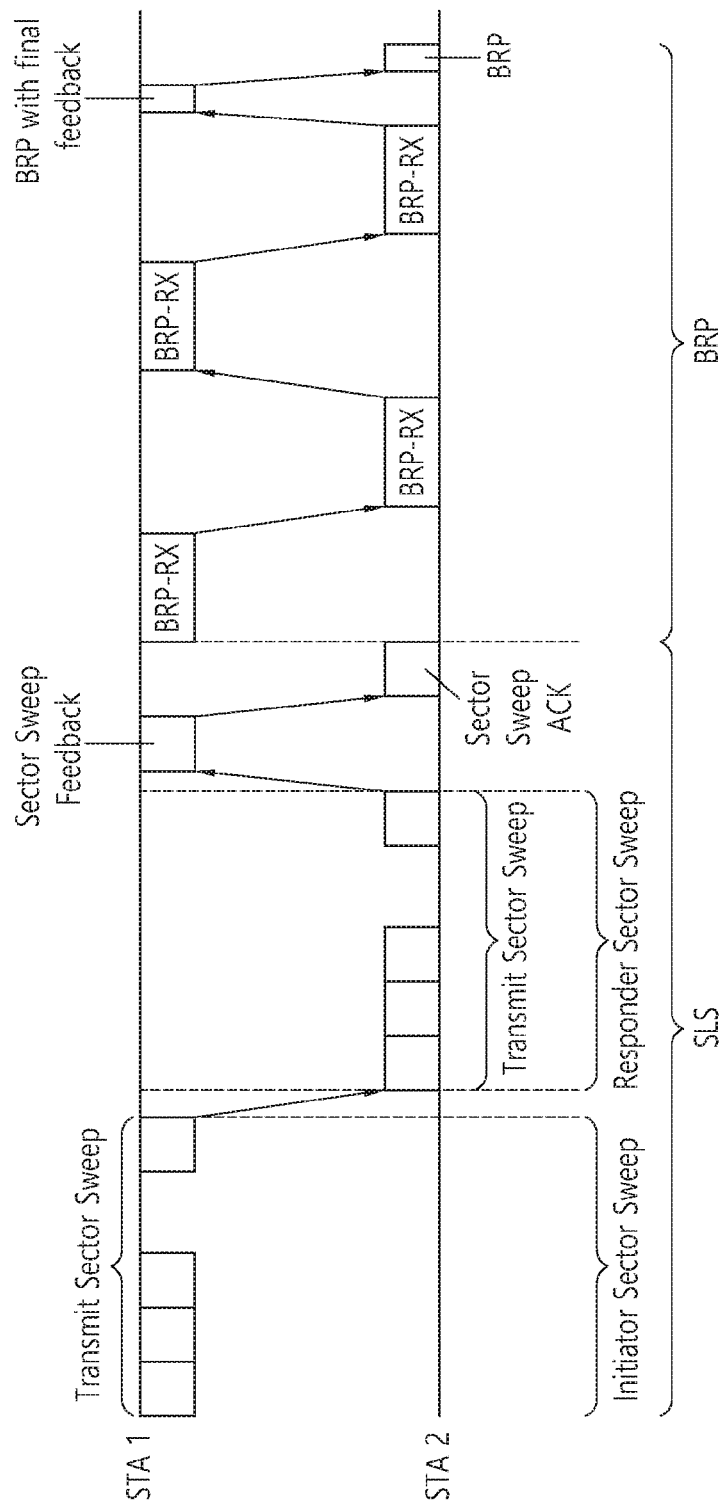
FIG. 1 is a diagram illustrating a beamforming training process according to the related art.

FIG. 1 is a diagram illustrating a beamforming training process according to the related art. This may refer to section 9.35 of the IEEE 802.11ad standard.

A STA1 may be an initiator that initiates beamforming (BF) training. A STA2 that participates in the BF training may be a responder.

The BF training provides a transmission of a BF training frame using a sector sweep (SSW) and a signaling required for each STA to determine setting an appropriate antenna system. The BF training process may include a sector level sweep (SLS) process and a beam refinement protocol (BRP) process. The SLS process for the sector sweep may allow communication between the STAs to provide a control physical layer (PHY). The BRP process provides a refinement of an antenna weight vector between the transmitter and the receiver.

The BF training may be initiated by the initiator from the SLS process. The SLS process may include an initiator sector sweep (ISS) for training an initiator link, a responder sector sweep (RSS) for training a responder link, a sector sweep (SSW) feedback, and a SSW ACK.

During the ISS process, the initiator may transmit each frame (a beacon frame or a SSW frame) to each of the sectors which the initiator has. During the RSS process, the responder may transmit each of the SSW frames to each of the sectors which the responder has. During the SSW process, the initiator may send a SSW feedback frame to the responder. The SSW feedback frame may include information about a sector and an antenna which are selected by the initiator. The SSW ACK frame may be transmitted through a sector included in the SSW feedback frame which is most recently received and the antenna.

A sector may correspond to a specific antenna beam or pattern. A transmit (TX) sector may be a sector for a TX antenna, and a receive (RX) sector may be a sector for a RX antenna.

A sector (a TX sector and/or a RX sector) in which an initiator has the best quality and a sector (a TX sector and/or a RX sector) in which a responder has the best quality may be determined through the SLS process.

When the SLS process is completed, the BRP process for training an RX antenna array and a TX antenna array may be initiated. The BRP process may include a BRP setup subphase, a multiple sector ID detection (MID) subphase, a beam combining (BC) subphase, and the like.

Figure 2:
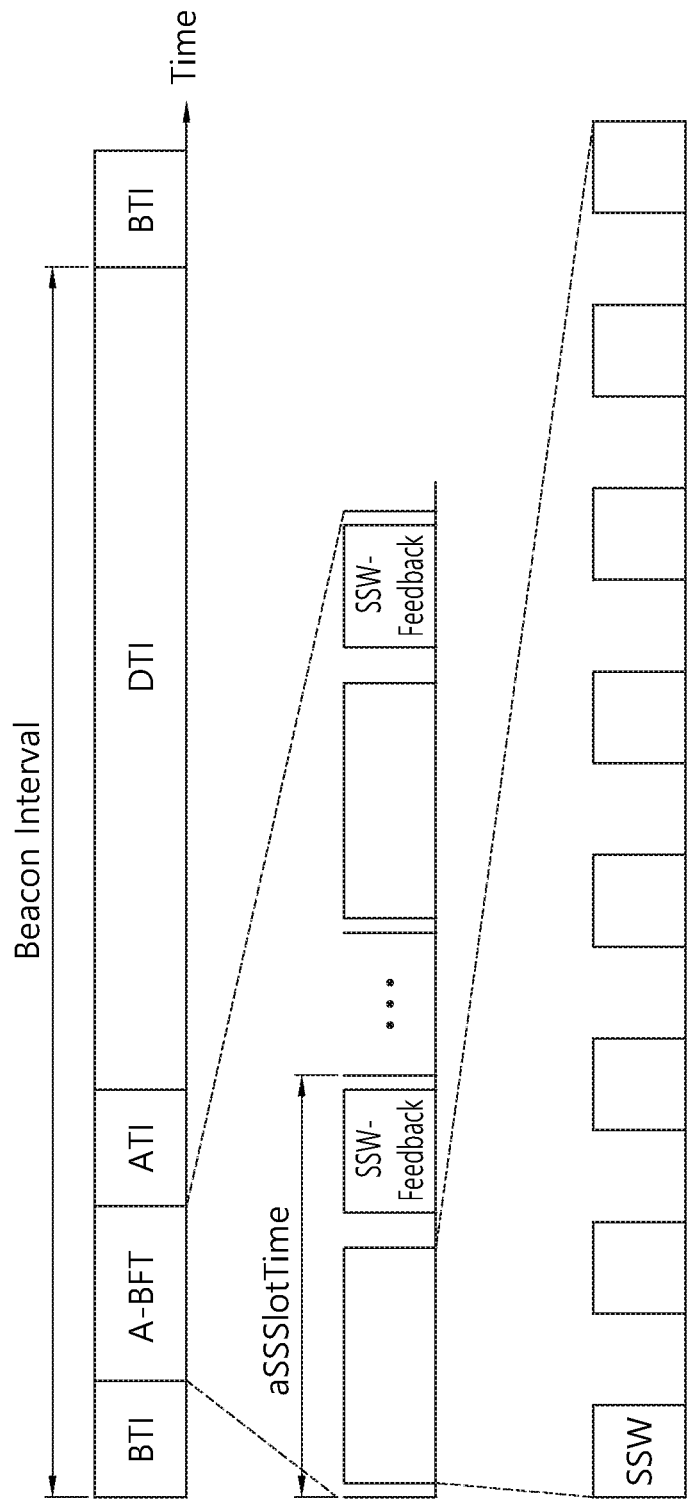
FIG. 2 is a diagram illustrating an example of a SLS process.

FIG. 2 is a diagram illustrating an example of a SLS process.

When an initiator is an AP and a responder is a non-AP STA, a beacon frame may be transmitted during the ISS process. A beacon interval may be a time period in which a beacon frame is transmitted.

A beacon transmission interval (BTI) may be a time interval between the start of a first beacon transmission by the AP in a beacon interval to the end of a last beacon transmission by the AP in the same beacon interval. An association beamforming training (A-BFT) may be a time period including a responder sector sweep (RSS) and a SSW feedback in the SLS process for beamforming (BF). An announcement transmission interval (ATI) may be a time interval for a request-response based management between the AP and the STA. A data transfer interval (DTI) may be a time interval for exchanging data.

The A-BFT is performed by a SSW slot unit, and a length of the A-BFT is defined as an integer multiple length of the SSW slot. A-BFT length information may be included in the beacon frame.

The SSW slot has a length of aSSSlotTime. The aSSSlotTime is defined as follows: aSSSlotTime=aAirPropagationTime+aSSDuration+MBIFS+aSSFBDuration+MBIFS. The aAirPropagationTime is a parameter considering the propagation delay between the initiator and the responder. The aSSDuration is a time for the responder to transmit M SSW frames in the SSW slot. Information about the number M of allowed SSW frames per a SSW slot may be included in the beacon frame. FIG. 2 is a diagram illustrating a case where M=8. Medium beamforming interframe spacing (MBIFS) represents an interval between the BTI and A-BFT or an interval between ISS, RSS, SSW feedback, and SSW ACK.

At the beginning of each A-BFT, the STA as the responder may invoke a random back-off process to start or resume the RSS. At the beginning of the A-BFT, the STA may randomly select a backoff count from a uniform distribution [0, (A-BFT length-1)]. The STA decrements the backoff counter by one at the end of each SSW slot. The STA initiates RSS in the corresponding SSW slot when the back-off count value is 0 at the start of the SSW slot. In the corresponding SSW slot, the STA may transmit a maximum of M SSW frames. If there are more SSW frames sent by the STA, the RSS may be resumed in the next SSW slot before the A-BFT is finished. If the RSS is not completed before the A-BFT is finished, the backoff process may be performed again before the RSS is resumed in the next A-BFT.

The AP may send a SSW feedback before the SSW slot expires. The information included in the SSW feedback may be based on the SSW frame received in the SSW slot where the SSW feedback is transmitted. The SSW feedback may include information about a sector and an antenna which are selected by the AP.

The STA has an RSS fail count. Although the RSS fail count is performed during an A-BFT(s) period, the RSS fail count may be the number of consecutive times which do not receive the SSW feedback as a response. For example, it may be assumed that an A-BFT period has 8 SSW slots and the STA transmits SSW frames in 4 SSW slots for 2 A-BFT periods. If the STA does not receive the SSW feedback from 3 SSW slots of 4 SSW slots, the value of the RSS fail count may be 3.

When the value of the RSS fail count exceeds the RSS retry limit, the STA may select a random value selected from the uniform distribution [0, RSSBackoff) as a backoff count. The STA may decrement the backoff count by 1, one by one at the end of each A-BFT. When the backoff count reaches zero, the STA may resume the RSS in the A-BFT. When the STA receives the SSW feedback during the A-BFT, the RSS fail count may be set to zero.

Figure 3:
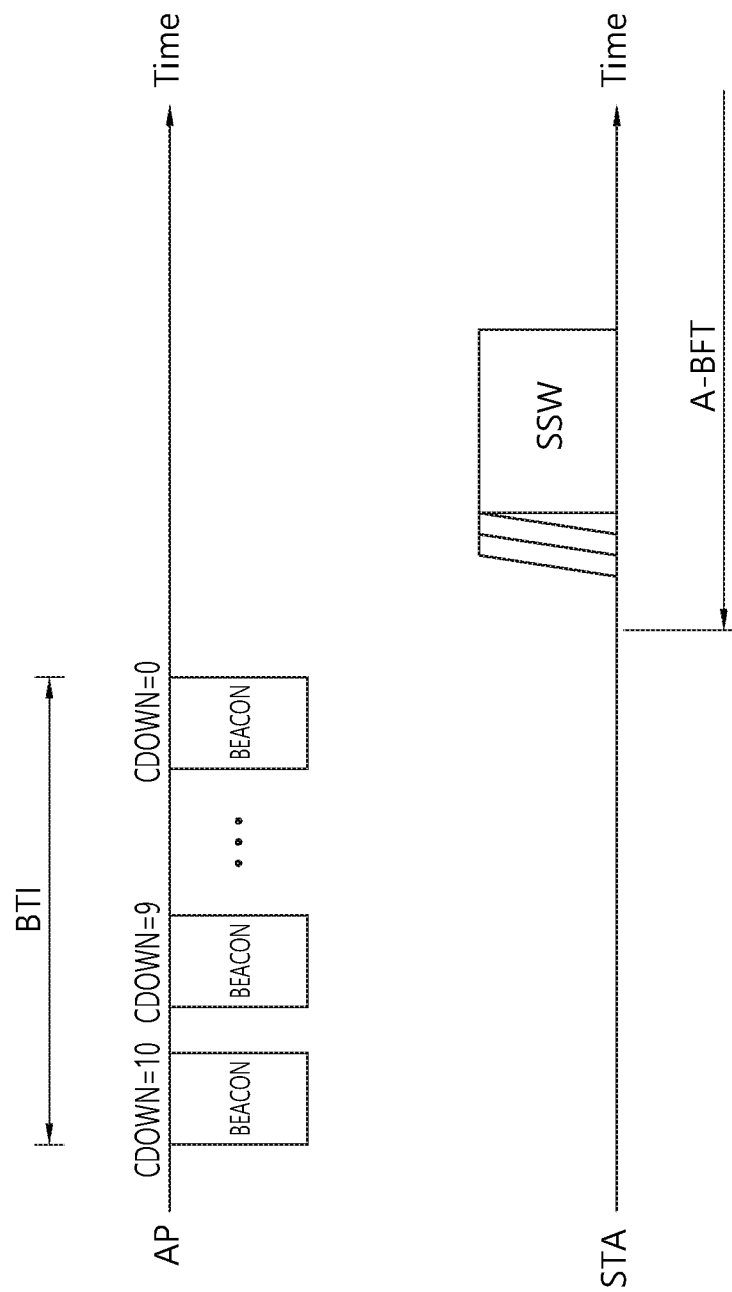
FIG. 3 is a diagram illustrating beamforming training according to an embodiment of the present invention.

FIG. 3 is a diagram illustrating beamforming training according to an embodiment of the present invention.

During one or more BTI, an AP may send one or more beacon frames to a STA through all available sectors. A beacon frame may include a down-counter (CDOWN) field, a duration field, a sector field and/or an antenna field. The DOWN field indicates the total number of remaining beacon transmissions until the end of the TX ISS. The DOWN field of the last beacon frame of TX ISS is set to 0. The duration field indicates the remaining time until the end of the current BTI. A sector field indicates a sector in which a beacon frame having this sector field is transmitted. An antenna field indicates the antenna in which the beacon frame with this sector field is used.

The beacon frame may further include an overload indicator indicating an overload state. The AP may check whether it is an overload situation considering SSW feedback generation, the number of connected STAs, and the like.

An overload indicator may be included in every beacon frame, but it may also be included in a beacon frame with a specific CDOWN (e.g., CDOWN=0) value. The overload indicator may have 1 bit, but this is only an example. For example, when the overload indicator is set to "0", since it is not in the overloaded state, it is possible to instruct the STA to describe the described backoff in the example of FIG. 2. When the overload indicator is set to "1", it is possible to instruct the STA to backoff as follows in the overload state.

Based on the overload indicator, the STA may determine whether to invoke the random backoff during the A-BFT which is subsequent to the current BTI. For example, when the overload indicator indicates an overload state, the STA may acquire a random value. When the random value exceeds the limit value, the STA may invoke a random backoff process for RSS during the corresponding A-BFT. When the random value does not exceed the limit value, the STA may omit the random backoff process for RSS during the corresponding A-BFT, and vice versa. The limit value may be determined in advance or may be generated from the overload indicator. Alternatively, the information on the limit value may be included in a beacon frame having an overload indicator. When the degree of congestion is severely high, only a certain number of STAs may be allowed to access the current A-BFT, thereby reducing collisions.

When the random backoff process is omitted, the RSS failure count may be increased by 1.

The beacon frame may include information on parameters for RSS retry (RSS retry limit and/or RSS backoff). The parameters for the RSS backoff may be dynamically adjusted to reduce collisions. This information may be included in each beacon frame, but it may be included only in a beacon frame with a specific CDOWN (e.g., CDOWN=0) value. Adjusting the RSS retry dynamically according to the degree of congestion may reduce collisions.

Figure 4:
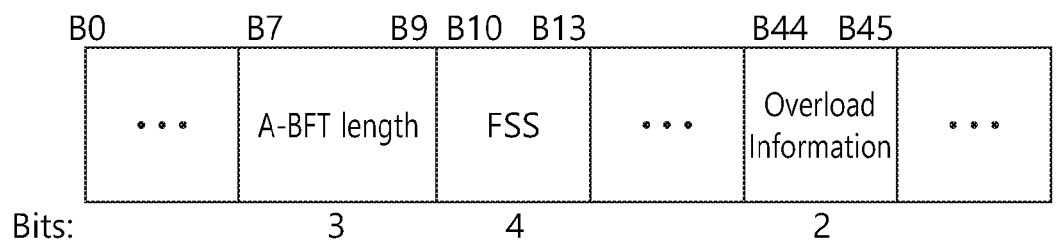
FIG. 4 shows an example of a control field included in a beacon frame.

FIG. 4 shows an example of a control field included in a beacon frame.

Although it is exemplarily shown that the control field is 48 bits, the names and the number of bits of each subfield in the control field are merely illustrative.

The length subfield of the A-BFT indicates the length of the A-BFT defined by a SSW slot unit. The value of the length subfield may have a range from 0 to 8. The FSS subfield indicates the number of SSW frames permitted for each slot of the SSW. The value of the FSS subfield may have a range from 0 to 16.

Overload information may include overload indicator, RSS retry limit and RSS backoff. The following table shows an example of use when B44 and B45 bits are used for overload information.

TABLE 1

| B44 | B45 | Contents |
| --- | --- | --- |
| 0 | 0 | It is not overloaded. RSS retry limit and RSS backoff use predefined values. |
| 0 | 1 | Overload state. RSS retry limit = 6, RSS back off = 12 |

TABLE 1-continued

| B44 | B45 | Contents |
| --- | --- | --- |
| 1 | 0 | Overload state. RSS retry limit = 4, RSS back off = 16 |
| 1 | 1 | Overload state. RSS retry limit = 2, RSS back off = 24 |

Figure 5:
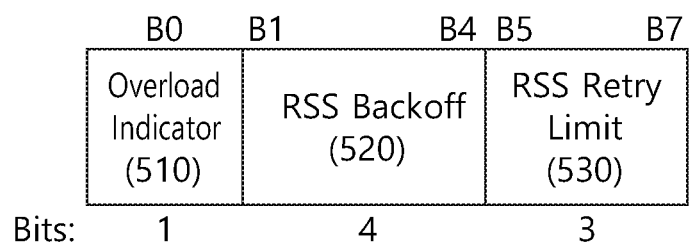
FIG. 5 shows another example of overload information.

FIG. 5 shows another example of the overload information.

The overload information may be included in a beacon frame and may have a size of 8 bits. The overload indicator 510 has 1 bit, the RSS back off 520 has 4 bits and the RSS retry limit 530 has 3 bits. The number of bits of the overload information, the name of the subfield, or the number of bits is merely an example.

Values of RSS backoff 520 and RSS retry limit 530 may be used based on overload indicator 510. For example, when the overload indicator 520 points to "0", the values of RSS backoff 520 and RSS retry limit 530 may be not used but preset values may be used. When the overload indicator 520 points to "1", the values of RSS back off 520 and RSS retry limit 530 may be used.

Collisions may be reduced by distributing random access attempts in a dense environment with a large number of devices.

Figure 6:
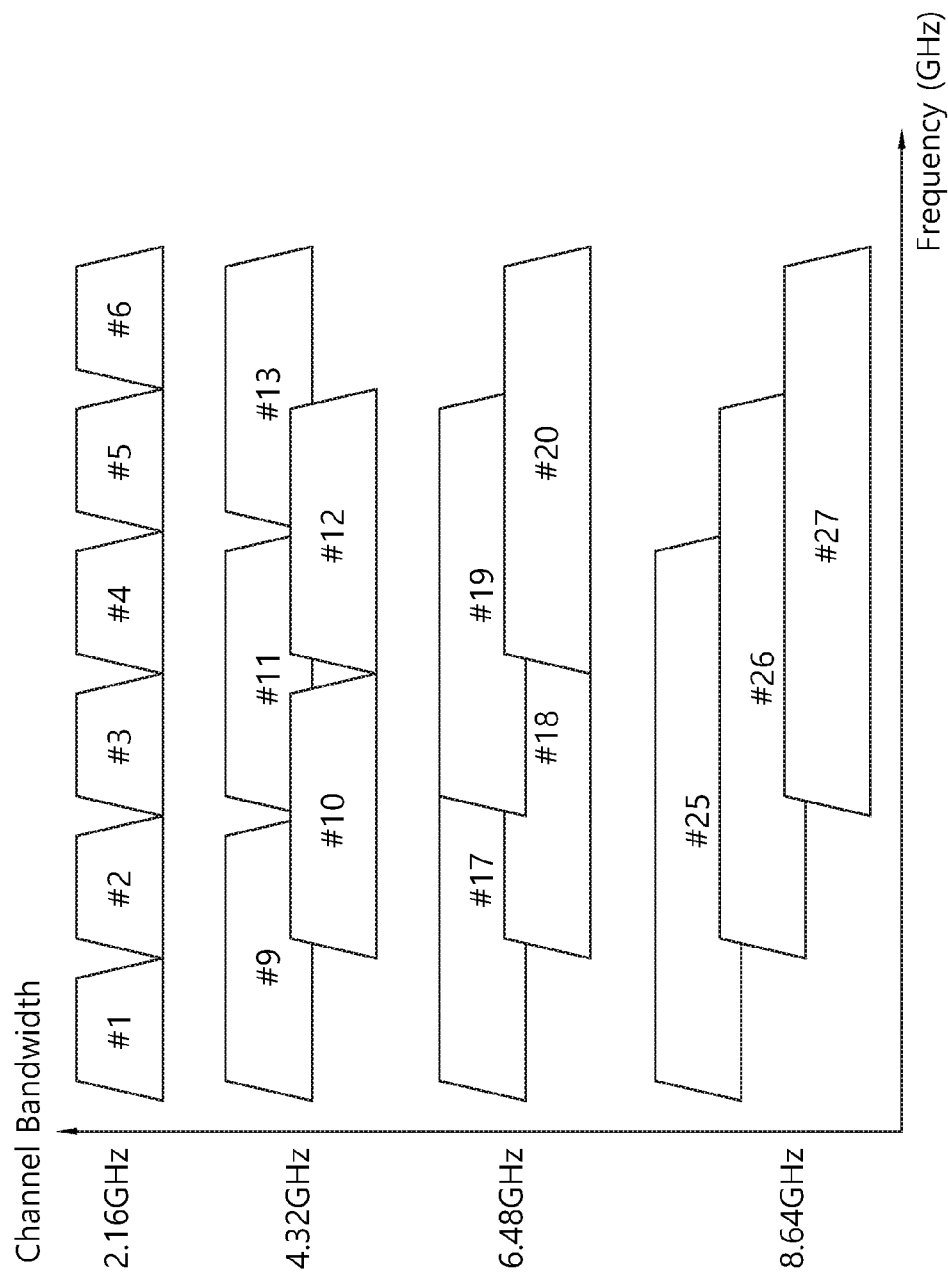
FIG. 6 shows an example of channelization in which a plurality of channels are used.

FIG. 6 shows an example of channelization in which a plurality of channels are used.

There are eight base channels. Although each of the eight base channels has a bandwidth of 2.16 GHz, there is no limitation on the number of base channels or the bandwidth. A plurality of base channels may be bonded to define a bonding channel. For example, a bonding channel with a bandwidth of 4.32 GHz may be defined by bonding two base channels. A bonding channel with a bandwidth of 6.48 GHz may be defined by bonding three base channels. A bonding channel with a bandwidth of 8.64 GHz may be defined by bonding four base channels.

Conventional beamforming training was performed on one channel, but beamforming training according to an embodiment of the inventive concept may be executed simultaneously on a plurality of channels. When multiple A-BFTs are executed simultaneously on the plurality of channels, an RSS backoff parameter may be defined as follows.

In an embodiment, RSS backoff parameters may be commonly defined across multiple channels. It is assumed that overload information is given as in the embodiment of FIG. 5. RSS backoff 520 and RSS retry limit 530 may be parameters that are commonly applied across multiple channels. For example, when the overload indicator 520 points to "0", the values of RSS backoff 520 and RSS retry limit 530 may be not used but preset values may be used. When the overload indicator 520 points to "1", the values of RSS backoff 520 and RSS retry limit 530 may be commonly used across a plurality of channels where A-BFTs are performed.

In another embodiment, RSS backoff parameters may be defined for each of the plurality of channels. FIG. 7 shows another example of the overload information. The overload information may include an overload indicator 710, N RSS backoffs 720-1, . . . , and 720-N, N RSS retry limits 730-1, . . . , and 730-N. RSS backoff and RSS retry limit may be given for each channel when A-BFTs are executed simultaneously on N channels.

The overload indicator may be defined for each channel. That is, the overload information may include multiple overload indicators for multiple channels. According to the overload indicator of a particular channel, it may be determined whether to apply the RSS backoff and the RSS retry limit on the particular channel.

Figure 8:
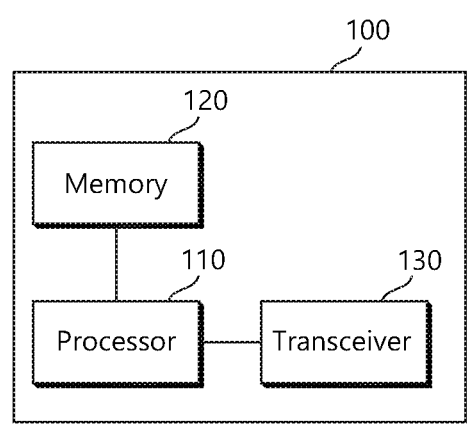
FIG. 8 is a block diagram illustrating an apparatus in which an embodiment of the present invention is implemented.

FIG. 8 is a block diagram illustrating an apparatus in which an embodiment of the present invention is implemented.

An apparatus 100 may include a processor 110, a memory 120, and a transceiver 130.

The memory 120 may be coupled to the processor 110 and may store a variety of instructions which are executed by the processor 110. The transceiver 130 may be coupled to the processor 110 to transmit and/or receive radio signals. The processor 110 may implement a limited functionality, process and/or method. The operation of the STA (an initiator or responder) may be implemented by the processor 110. When the above-described embodiment is implemented in software instructions, the software instructions may be stored in the memory 120 and may be executed by the processor 110 to perform the operation described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the aforementioned exemplary systems, methods, but is described on the basis of the flowchart as a series of steps or blocks, the present invention is not limited to the order of the steps, which steps are described above as, can occur with other steps and in a different order or simultaneously. In addition, those skilled in the art will appreciate that the steps illustrated in the flow chart may be deleted without affecting the scope of, not exclusive, a different step, or contains one or more of the steps of the flow chart the present invention.

What is claimed is:

1. A method for performing beamforming training in a wireless local area network, the method comprises:
   receiving, by a station (STA), a plurality of beacon frames for sector sweep in a beacon transmission interval (BTI) from an access point (AP), wherein at least one beacon frame of the plurality of beacon frames includes overload information which indicates an overload state; and
   performing, by the STA, a random backoff on a plurality of channels during association-beamforming training (A-BFT) consequent to the BTI based on the overload information.

2. The method of claim 1, wherein the overload information comprises an overload indicator indicating the overload state, a responder sector sweep (RSS) backoff and an RSS retry limit.

3. The method of claim 2, wherein the RSS backoff and the RSS retry limit are commonly applied to the plurality of channels.

4. The method of claim 2, wherein the overload information comprises a plurality of RSS backoffs for the plurality of channels and a plurality of RSS retry limits for the plurality of channels.

5. The method of claim 2, wherein the overload information comprises a plurality of overload indicators for the plurality of channels.

6. The method of claim 2, wherein the performing of random backoff from the plurality of channels comprises:
   selecting, by the STA, randomly a random value for each channel based on the RSS backoff when the overload indicator indicates an overload state; and
   determining, by the STA, whether to invoke the random backoff for each channel in the A-BFT based on the selected random value.

7. The method of claim 6, wherein the performing of random backoff from the plurality of channels further comprises:
   increasing, by the STA, a responder sector sweep (RSS) (responder sector sweep) failure count by 1 when the invocation of the random backoff fails.

8. The method of claim 7, wherein the performing of random backoff from the plurality of channels further comprises:
   invoking, by the STA, the random backoff at the next A-BFT when the RSS failure count exceeds the RSS retry limit.

9. The method of claim 1, wherein the A-BFT comprises a plurality of sector sweep (SSW) slots.

10. An apparatus for performing beamforming training in a wireless local area network, the apparatus comprises:
    a transceiver configured to transmit and receive a radio signal; and
    a processor connected to the transceiver and configured to:
    receive a plurality of beacon frames for sector sweep in a beacon transmission interval (BTI) from an access point (AP), wherein at least one beacon frame of the plurality of beacon frames includes overload information which indicates an overload state; and
    perform a random backoff on a plurality of channels during association-beamforming training (A-BFT) consequent to the BTI based on the overload information.

11. The apparatus of claim 10, wherein the overload information comprises an overload indicator indicating the overload state, a responder sector sweep (RSS) backoff and an RSS retry limit.

12. The apparatus of claim 11, wherein the RSS backoff and the RSS retry limit are commonly applied to the plurality of channels.

13. The apparatus of claim 11, wherein the overload information comprises a plurality of RSS backoffs for the plurality of channels and a plurality of RSS retry limits for the plurality of channels.

* * * * *